United States Patent
Higashiyama et al.

(10) Patent No.: US 10,914,948 B2
(45) Date of Patent: Feb. 9, 2021

(54) DISPLAY DEVICE, DISPLAY CONTROL METHOD, AND STORAGE MEDIUM

(71) Applicant: HONDA MOTOR CO., LTD., Tokyo (JP)

(72) Inventors: Masafumi Higashiyama, Wako (JP); Takuya Kimura, Wako (JP); Shinji Kawakami, Wako (JP); Tatsuya Iwasa, Wako (JP); Yuji Kuwashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/525,843

(22) Filed: Jul. 30, 2019

(65) Prior Publication Data
US 2020/0049983 A1 Feb. 13, 2020

(30) Foreign Application Priority Data

Aug. 7, 2018 (JP) .................. 2018-148547

(51) Int. Cl.
*G02B 27/01* (2006.01)
*G09G 5/38* (2006.01)
*G09G 5/37* (2006.01)

(52) U.S. Cl.
CPC ..... *G02B 27/0101* (2013.01); *G02B 27/0149* (2013.01); *G09G 5/37* (2013.01); *G09G 5/38* (2013.01); *G02B 2027/014* (2013.01); *G02B 2027/0159* (2013.01); *G09G 2354/00* (2013.01)

(58) Field of Classification Search
CPC .. G02B 27/0101; G02B 27/0149; G09G 5/37; G09G 5/38; B60K 35/00; B60K 37/00; B60W 50/14; B60W 50/146
See application file for complete search history.

(56) References Cited

U.S. PATENT DOCUMENTS

| | | | | |
|---|---|---|---|---|
| 9,835,863 B2* | 12/2017 | Emura | ................ | G02B 27/017 |
| 2013/0145297 A1* | 6/2013 | Ricci | ................ | G07C 5/08 |
| | | | | 715/765 |
| 2014/0293230 A1* | 10/2014 | Arase | ................ | H04N 9/3129 |
| | | | | 353/13 |
| 2018/0074497 A1* | 3/2018 | Tsuji | ................ | B60R 16/02 |
| 2018/0081614 A1* | 3/2018 | Tsai | ................ | B60K 35/00 |
| 2018/0164998 A1* | 6/2018 | Fujita | ................ | H04N 9/3141 |
| 2018/0273050 A1* | 9/2018 | Tertoolen | ................ | B60R 1/00 |
| 2020/0064640 A1* | 2/2020 | Nagano | ................ | G09G 5/00 |

FOREIGN PATENT DOCUMENTS

JP    2017-091115    5/2017

* cited by examiner

*Primary Examiner* — Sardis F Azongha
(74) *Attorney, Agent, or Firm* — Amin, Turocy & Watson, LLP

(57) ABSTRACT

A display device includes an image generation device configured to superimpose an image on a landscape and allow a viewer to visually recognize the image, a control device configured to control the image generation device, and an operation unit configured to receive an operation related to display of the image. The image generation device generates a first image constantly displayed and a second image displayed on the basis of occurrence of a predetermined event, and the control device changes a display mode of one or both of the first image and the second image output by the image generation device on the basis of a content of the image generated by the image generation device and an operation content by the operation unit.

12 Claims, 8 Drawing Sheets

| PRESENCE OR ABSENCE OF SECOND IMAGE | CHANGE CONDITION | | DISPLAY MODE |
|---|---|---|---|
| | TYPE OF SECOND IMAGE | OPERATION CONDITION | |
| PRESENCE | DIRECTION INDICATION | RECEIVE OPERATION OF SELECTION SWITCH WITHIN THREE SECONDS AFTER DISPLAY | INCREASE DEPRESSION ANGLE |
| | | RECEIVE OPERATION OF SELECTION SWITCH WITHIN FIVE SECONDS AFTER DISPLAY | REDUCE LUMINANCE |
| | INCOMING CALL | — | STOP DISPLAY |
| ⋯ | ⋯ | ⋯ | ⋯ |
| ABSENCE | | | |

DISPLAY DEVICE, DISPLAY CONTROL METHOD, AND STORAGE MEDIUM

CROSS-REFERENCE TO RELATED APPLICATION

Priority is claimed on Japanese Patent Application No. 2018-148547, filed Aug. 7, 2018, the content of which is incorporated herein by reference.

BACKGROUND

Field of the Invention

The present invention relates to a display device, a display control method, and a storage medium.

Description of Related Art

In the related art, a head up display (HUD) device that displays an image related to basic information for a driver on a front windshield is known (for example, Japanese Unexamined Patent Application First Publication No. 2017-91115). Using this HUD device, the driver is able to ascertain various pieces of displayed information while maintaining a direction of a line of sight to the front at the time of driving by displaying various marks indicating an obstacle, a reminder, and a progress direction superimposed on a landscape in front of a vehicle.

SUMMARY

However, in the prior art, since one display mode for information based on a surrounding situation and a traveling situation is specified, an image may not be displayed in a display mode suitable for a viewer in some cases. In a case in which the display mode is set on a setting screen in advance, since an operation is required to a deep hierarchy, it is not possible to quickly change the display mode in some cases.

An aspect of the present invention has been made in consideration of such circumstances and an object of the aspect of the present invention is to provide a display device, a display control method, and a storage medium capable of displaying an image in a more suitable display mode.

A display device, a display method, and a storage medium according to the present invention adopt the following constitutions.

(1): A display device according to an aspect of the present invention includes an image generation device configured to superimpose an image on a landscape and allow a viewer to visually recognize the image, a control device configured to control the image generation device, and an operation unit configured to receive an operation related to display of the image. The image generation device generates a first image constantly displayed and a second image displayed on the basis of occurrence of a predetermined event, and the control device changes a display mode of one or both of the first image and the second image output by the image generation device on the basis of a content of the image generated by the image generation device and an operation content by the operation unit.

(2): In the aspect of (1) described above, in a state in which the first image generated by the image generation device is displayed, in a case in which the operation by the operation unit is received, the control device stops the generation of the first image by the image generation device or erases the displayed first image.

(3): In the aspect of (1) described above, in a case in which the operation by the operation unit is received within a predetermined time after the second image generated by the image generation device is displayed, the control device changes the display mode of the second image.

(4): In the aspect of (3) described above, in the case in which the operation by the operation unit is received within the predetermined time after the second image generated by the image generation device is displayed, the control device changes a luminance of the second image.

(5): In the aspect of (3) described above, in a case in which the operation by the operation unit is received within the predetermined time after the second image generated by the image generation device is displayed, the control device changes a depression angle of the second image.

(6): In the aspect of (3) described above, in the case in which the operation by the operation unit is received within the predetermined time after the second image generated by the image generation device is displayed, the control device stops the generation of the first image and the second image by the image generation device, or stops the generation of the second image.

(7): In the aspect of (3) described above, in the case in which the operation by the operation unit is received within the predetermined time after the second image generated by the image generation device is displayed, the control device erases the displayed first image and second image, or erases the displayed second image.

(8): In the aspect of (1) described above, the image generation device includes a light projection device configured to output the image as light, an optical mechanism provided on a path of the light and capable of adjusting a distance from a predetermined position to a position where the light is formed as a virtual image, a concave mirror configured to reflect light passing through the optical mechanism toward a reflector, a first actuator configured to adjust the distance in the optical mechanism, and a second actuator configured to adjust a reflection angle of the concave mirror.

(9): A display control method according to an aspect of the present invention causes a display device to superimpose and generate an image on a landscape and allow a viewer to visually recognize the image by an image generation device, control the image generation device by a control device, receive control of a display position of the image by an operation unit, generate a first image constantly displayed and a second image displayed on the basis of occurrence of a predetermined event by the image generation device, and change a display mode of one or both of the first image and the second image output by the image generation device on the basis of a content of the image generated by the image generation device and an operation content by the operation unit.

(10): A non-transitory computer-readable storage medium according to an aspect of the present invention stores a program that causes a display device to superimpose and generate an image on a landscape, and allow a viewer to visually recognize the image by an image generation device, control the image generation device by a control device, receive control of a display position of the image by an operation unit, generate a first image constantly displayed and a second image displayed on the basis of occurrence of a predetermined event by the image generation device, and change a display mode of one or both of the first image and the second image output by the image generation device on the basis of a content of the image generated by the image generation device and an operation content by the operation unit.

According to the aspects of (1) to (10), it is possible to display an image in a more suitable display mode.

BRIEF DESCRIPTION OF THE DRAWINGS

FIG. 5 is a diagram showing an example of a content of a display mode change table.

DESCRIPTION OF EMBODIMENTS

Hereinafter, an embodiment of a display device, a display control method, and a storage medium of the present invention will be described with reference to the drawings. The display device is of an embodiment, for example, a device that is mounted on a vehicle (hereinafter referred to as a vehicle M) and causes an image to be viewed by being superimposed on a landscape. The display device is able to be referred to as a HUD device. As an example, a display device is a device that allows a viewer to visually recognize a virtual image by projecting light including an image on a front windshield of the vehicle M. The viewer is, for example, a driver, however, the viewer may be a passenger other than the driver. The display device may be realized by a light transmissive display device (for example, a liquid crystal display or an organic electroluminescence (EL)) attached to the front windshield of the vehicle M. The display device may project light on a transparent member (a visor, a lens of glasses, or the like) of a device worn by a person. Alternatively, the display device may be a display device to which a light transmissive display device is attached. In the following description, the display device is mounted on the vehicle M, and is a device that projects light including an image on the front windshield.

In the following description, a positional relationship and the like will be described using an XYZ coordinate system as appropriate.

[Overall Constitution]

Figure 1:
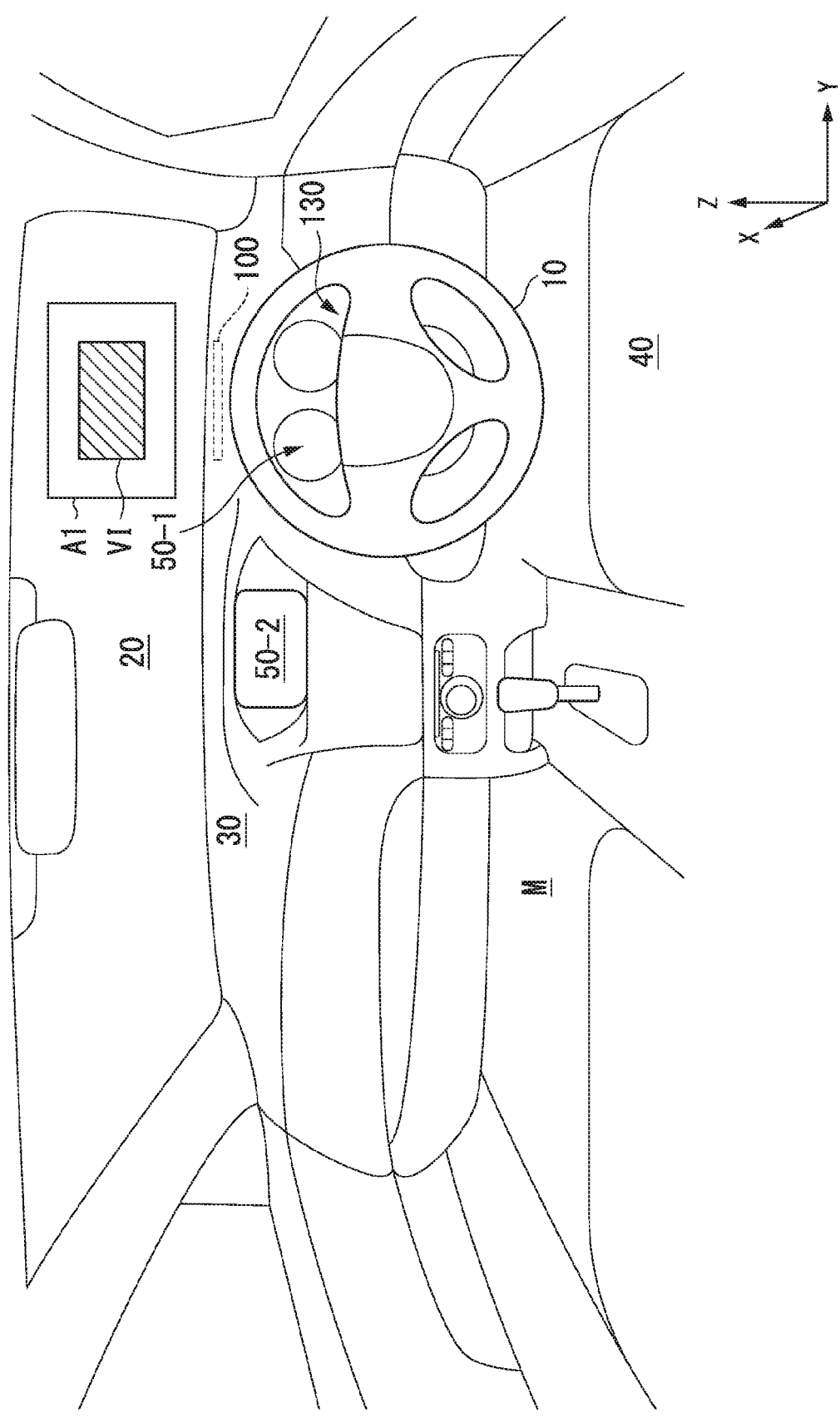
FIG. 1 is a diagram exemplifying a constitution of an interior of a vehicle M on which a display device according to an embodiment is mounted.

FIG. 1 is a diagram exemplifying a constitution of an interior of the vehicle M on which a display device 100 according to an embodiment is mounted. The vehicle M is provided with, for example, a steering wheel 10 that controls steering of the vehicle M, a front windshield (an example of a reflector) 20 that divides the interior of the vehicle from the outside of the vehicle, and an instrument panel 30. The front windshield 20 is a member having light transparency. The display device 100 allows the driver sitting in a driver's seat to visually recognize a virtual image VI by, for example, projecting light including an image on a displayable area A1 provided in a part of the front windshield 20 in front of a driver's seat 40.

The display device 100 causes the driver to visually recognize an image obtained by imaging, for example, information for supporting driving of the driver as a virtual image VI. The information for supporting the driving of the driver includes, for example, basic support information for supporting the driving of the driver, that is constantly displayed, and information displayed at the time of occurrence of a predetermined event such as an emergency or a predetermined function. For example, the basic support information includes information for causing the driver to recognize a speed of the vehicle M, a driving power distribution ratio, engine revolutions, an operation state of a driving support function, a shift position, a sign recognition result, an intersection point position, and the like. The driving support function is, for example, a direction indication function for guiding the vehicle M to a destination that is set in advance, an adaptive cruise control (ACC), a lane keep assist system (LKAS), a collision mitigation brake system (CMBS), a traffic jam assist function, and the like. The driving support function may include, for example, an incoming call or outgoing call of a telephone mounted on the vehicle M, and a telephone function for managing a call.

In addition to the display device 100, the vehicle M may be provided with a first display unit 50-1 and a second display unit 50-2. The first display unit 50-1 is a display device provided, for example, in the vicinity of the front of the driver's seat 40 in the instrument panel 30 and is able to be visually recognized by the driver from a gap of the steering wheel 10 or is able to be visually recognized through the steering wheel 10. The first display unit 50-1 displays, for example, an image related to a speedometer, a tachometer, and the information for supporting the driving of the driver. The second display unit 50-2 is attached to, for example, a central portion of the instrument panel 30. The second display unit 50-2 displays, for example, an image corresponding to a navigation process performed by a navigation device (not shown) mounted on the vehicle M, or a video of the other party in a videophone or the like. The second display unit 50-2 may display a television program, reproduce a DVD, or display contents such as a downloaded movie.

The vehicle M is provided with an operation switch (an example of an operator) 130 that receives an instruction to switch on/off the display by the display device 100 or an instruction to adjust a position of the virtual image VI. The operation switch 130 is attached, for example, to a position where the driver sitting on the driver's seat 40 is able to operate without greatly changing a posture. The operation switch 130 may be provided, for example, in front of the first display unit 50-1, may be provided on a boss portion of the steering wheel 10, or may be provided on a spoke that connects the steering wheel 10 and the instrument panel 30 with each other.

Figure 2:
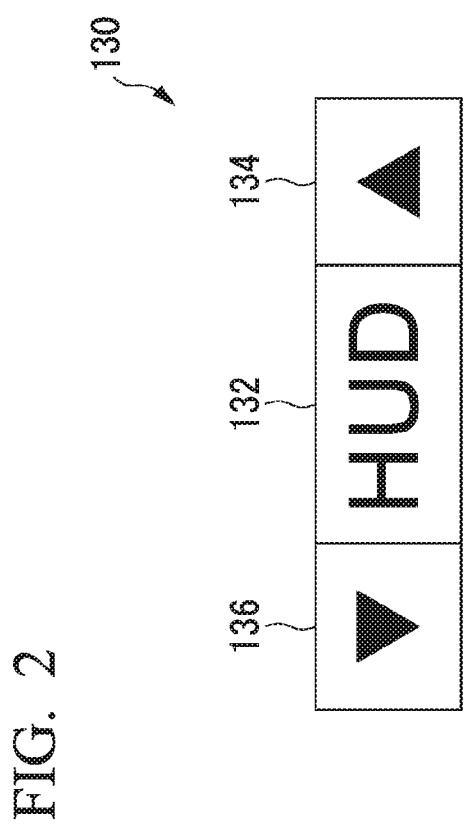
FIG. 2 is a diagram for describing an operation switch of the embodiment.

FIG. 2 is a diagram for describing the operation switch 130 of the embodiment. The operation switch 130 includes, for example, a main switch 132, and adjustment switches 134 and 136. The main switch 132 is a switch that switches on/off of the display device 100.

The adjustment switch 134 is, for example, a switch for receiving an instruction to move the position of the virtual image VI that is visually recognized as being in a space transmitted from a line of sight position P1 of the driver through the displayable area A1 to an upper side (hereinafter, referred to as an upward direction) with respect to a vertical direction Z. The driver is able to continuously move the visually recognized position of the virtual image VI in the upward direction in the displayable area A1 by continuously pressing the adjustment switch 134.

The adjustment switch 136 is a switch for receiving an instruction to move the position of the virtual image VI described above to a lower side (hereinafter, referred to as a downward direction) with respect to the vertical direction Z. The driver is able to continuously move the visually recognized position of the virtual image VI in the downward direction in the displayable area A1 by continuously pressing the adjustment switch 136.

The adjustment switch 134 may be a switch for increasing a brightness of the virtual image VI to be visually recognized instead of (or in addition to) moving the position of the virtual image VI in the upward direction. The adjustment switch 136 may be a switch for reducing the brightness of the virtual image VI to be visually recognized instead of (or in addition to) moving the position of the virtual image VI in the downward direction. Contents of the instruction received by the adjustment switches 134 and 136 may be switched on the basis of a certain operation. The certain operation is, for example, a long press operation of the main switch 132. In addition to the switches shown in FIG. 2, the operation switch 130 may include, for example, a switch for selecting display content or a switch for adjusting the brightness of the virtual image to be exclusively displayed.

Figure 3:
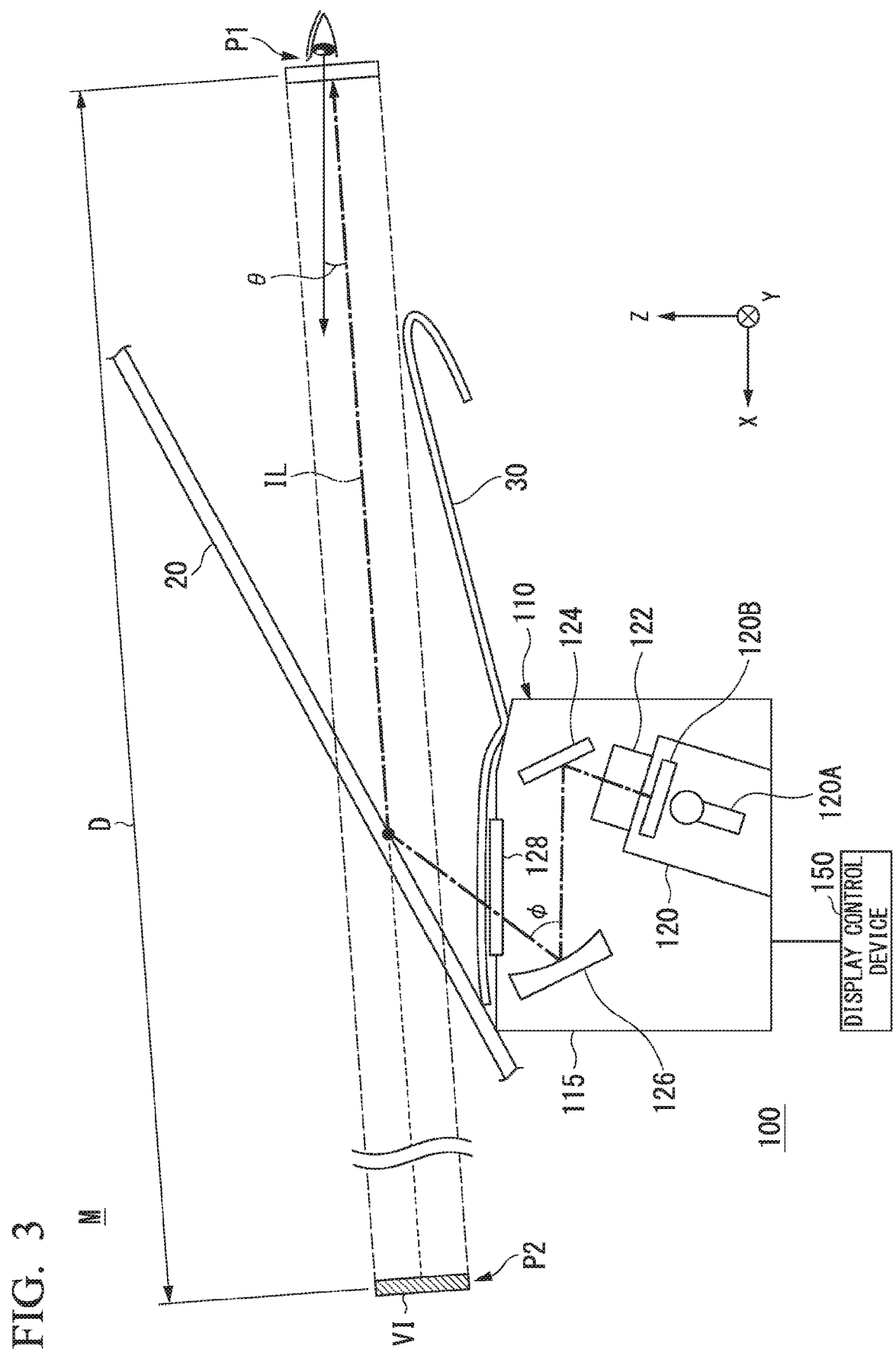
FIG. 3 is a partial constitution diagram of the display device.

FIG. 3 is a partial constitution diagram of the display device 100. The display device 100 includes, for example, a display (an example of an image generation device) 110 and a display control device 150. A combination of the display control device 150 and an optical system controller 170 and a display controller 172 that will be described later is an example of a "control device". The display 110 accommodates a light projection device 120, an optical mechanism 122, a plane mirror 124, a concave mirror 126, and a light transmission cover 128, for example, in a housing 115. In addition to these, the display device 100 includes various sensors and actuators, which will be described later. The display may have a constitution without the optical mechanism 122.

The light projection device 120 includes, for example, a light source 120A and a display element 120B. The light source 120A is, for example, a cold cathode tube, and outputs visible light corresponding to the virtual image VI to be visually recognized by the driver. The display element 120B controls transmission of the visible light from the light source 120A. The display element 120B is, for example, a liquid crystal display (LCD) of a thin film transistor (TFT) type. The display element 120B includes and image element in the virtual image VI by controlling each of a plurality of pixels to control a transmission degree of the visible light from the light source 120A for each color element, and determines a form (look) of the virtual image VI. Hereinafter, the visible light transmitted through the display element 120B and including the image is referred to as image light IL. The display element 120B may be an organic electro-luminescence (EL) display, and in this case the light source 120A may be omitted.

The optical mechanism 122 includes, for example, one or more lenses. The position of each lens is able to be adjusted, for example, in an optical axis direction. The optical mechanism 122 is provided, for example, on a path of the image light IL output from the light projection device 120, and passes the image light IL incident from the light projection device 120 and emits the image light IL toward the front windshield 20. The optical mechanism 122 is able to adjust, for example, a distance (hereinafter referred to as a virtual image visual recognition distance D) from the line of sight position P1 of the driver to a formation position P2 where the image light IL is formed as the virtual image by changing the position of the lens. The line of sight position P1 of the driver is a position where the image light IL is collected by being reflected by the concave mirror 126 and the front windshield 20, and is a position where it is assumed that the eyes of the driver are present at this position. The virtual image visual recognition distance D is strictly a distance of a line segment having an inclination in the vertical direction, however, in the following description, in a case in which it is expressed that "the virtual image visual recognition distance D is 7 [m]" or the like, the distance may mean the distance in the horizontal direction.

In the following description, a depression angle $\theta$ is defined as an angle formed by a horizontal plane passing through the line of sight position P1 of the driver and the line segment from the line of sight position P1 of the driver to the formation position P2. The more the virtual image VI is formed downward, that is, the more downward the line of sight direction at which the driver views the virtual image VI is formed, the larger the depression angle $\theta$ is. The depression angle $\theta$ is determined on the basis of a reflection angle $\varphi$ of the concave mirror 126 and a display position of an original image on the display element 120B. The reflection angle $\varphi$ is an angle formed by an incident direction in which the image light IL reflected by the plane mirror 124 is incident on the concave mirror 126 and an emission direction in which the concave mirror 126 emits the image light IL.

The plane mirror 124 reflects the visible light (that is, the image light IL) emitted by the light source 120A and having passed through the display element 120B in a direction of the concave mirror 126.

The concave mirror 126 reflects the image light IL incident from the plane mirror 124 and emits the image light IL toward the front windshield 20. The concave mirror 126 is supported so as to be rotatable (pivotable) about a Y axis that is an axis in a width direction of the vehicle M.

The light transmission cover 128 transmits the image light IL from the concave mirror 126 to cause the image light IL to reach the front windshield 20, and suppresses an entry of a foreign matter such as dust, dirt, or a water droplet into the housing 115. The light transmission cover 128 is provided in opening formed in an upper member of the housing 115. The instrument panel 30 is also provided with an opening or a light transmission member, and the image light IL passes through the light transmission cover 128 and the opening or the light transmission member of the instrument panel 30 to be reached the front windshield 20.

The image light IL incident to the front windshield 20 is reflected by the front windshield 20 and condensed at the line of sight position P1. At this time, in a case in which the eye of the driver is positioned at the line of sight position P1, the driver feels that the image captured by the image light IL is displayed in front of the vehicle M.

Figure 4:
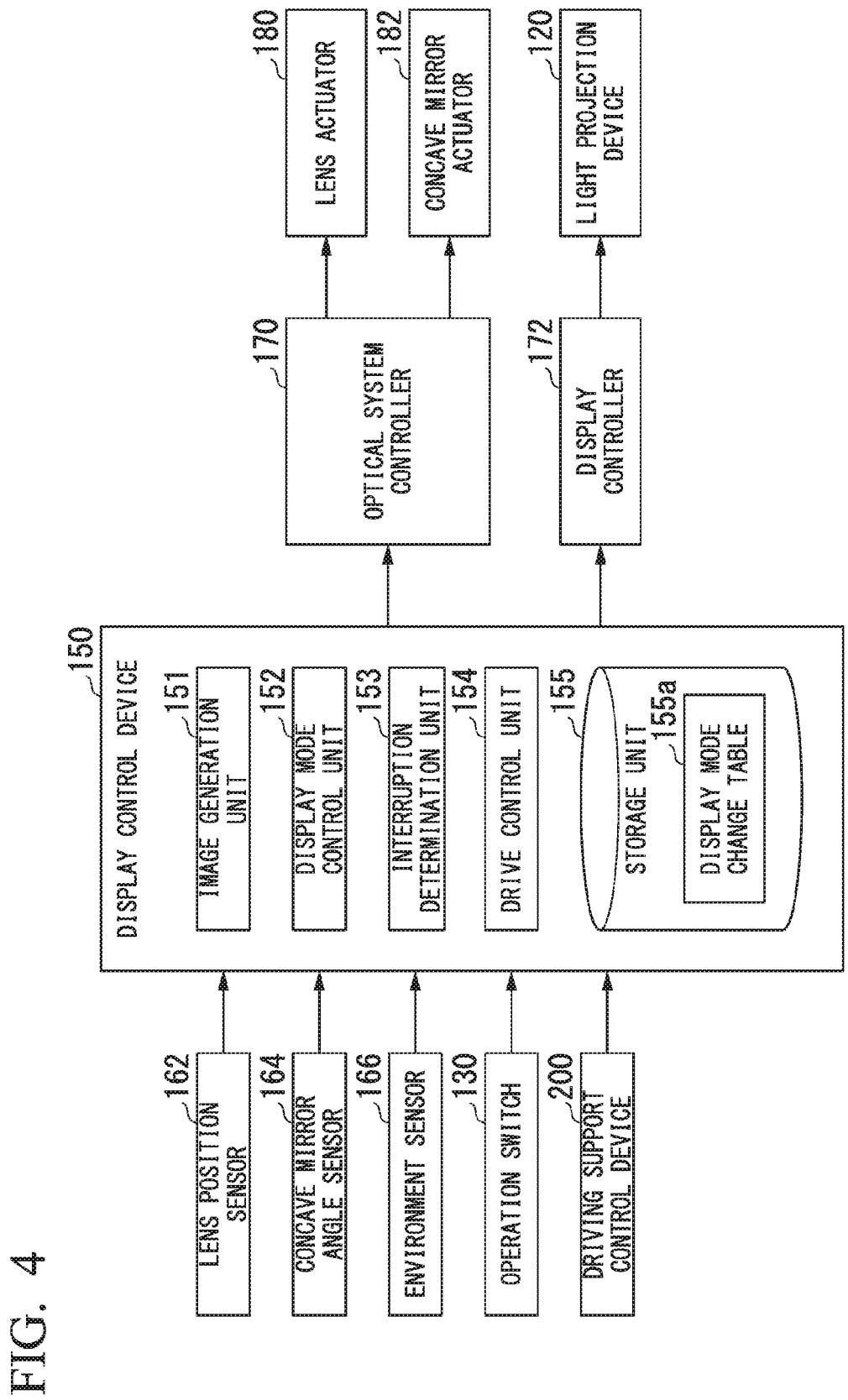
FIG. 4 is a diagram showing a constitution example of the display device centering on a display control device.

The display control device 150 controls the display of the virtual image VI to be visually recognized by the driver. FIG. 4 is a diagram showing a constitution example of the display device 100 centering on the display control device 150. In an example of FIG. 4, in addition to the display control device 150, a lens position sensor 162, a concave mirror angle sensor 164, an environment sensor 166, an operation switch 130, an optical system controller 170, a display controller 172, a lens actuator (an example of a first actuator) 180, a concave mirror actuator (an example of a second actuator) 182, the light projection device 120, and a driving support control device 200, which are included in the display device 100 are shown. Each constitution other than the display control device 150 will be described first.

The lens position sensor 162 detects a position of one or more lenses included in the optical mechanism 122. The concave mirror angle sensor 164 detects a rotation angle φ of the concave mirror 126 about the Y axis. The environment sensor 166 detects, for example, a temperature of the light projection device 120 or the optical mechanism 122. The environment sensor 166 may detect an illuminance around the vehicle M, detect the speed of the vehicle M, the steering angle, or detect an object present in the vicinity (for example, an obstacle such as another vehicle or a pedestrian). The environment sensor 166 may detect facts that it is necessary to check the brake system and engine system of the vehicle, headlight is set to high beam, a door is not locked, the door is not completely closed, fog light is turned on, there is an incoming call in a telephone function mounted on the vehicle M, a timing to turn to the left or right for heading to a destination set in a navigation device is approached, and the like.

The optical system controller 170 drives the lens actuator 180 on the basis of the control signal output by the drive control unit 154 to adjust the virtual image visual recognition distance D. The optical system controller 170 drives the concave mirror actuator 182 on the basis of the control signal output by the drive control unit 154 to adjust the rotation angle φ of the concave mirror.

The display controller 172 controls the light projection device 120 to output an image based on a display mode generated by an image generation unit 151 and determined by a display mode control unit 152. The image includes, for example, an image (hereinafter referred to as a first image) related to the basic support information for supporting the driving of the driver, which is constantly displayed, and an image (hereinafter referred to as a second image) displayed at the time of occurrence of a predetermined event such as an emergency or a predetermined function. The predetermined event is, for example, an event that occurs due to a state of the vehicle M. The events include an event corresponding to various functions by the driving support control device 200, and an event (an inspection instruction or warning) generated by information detected by the environment sensor 166. The second image may be displayed by being inserted into the first image, or may be displayed together with the first image.

The lens actuator 180 acquires a drive signal from the optical system controller 170, drives a motor or the like on the basis of the acquired drive signal, and moves the position of one or more lenses included in the optical mechanism 122. Therefore, the virtual image visual recognition distance D is adjusted.

The concave mirror actuator 182 acquires a drive signal from the optical system controller 170, drives a motor or the like on the basis of the acquired drive signal, and rotates the concave mirror actuator 182 about the Y axis to adjust the reflection angle φ of the concave mirror 126. Therefore, the depression angle θ is adjusted.

The driving support control device 200 executes a driving support function that supports a driving operation by the driver of the vehicle M. In a case in which the driving support function is executed, for example, the vehicle M controls one or both of steering control or speed control without depending on an operation of a driving operation element (for example, a steering wheel 10, an accelerator pedal, and a brake pedal) by the driver. For example, when executing the ACC as the driving support function, the driving support control device 200 performs acceleration and deceleration control (speed control) based on an inter-vehicle distance from the preceding vehicle so that the vehicle travels in a state in which the inter-vehicle distance between the vehicle M and the preceding vehicle keeps constant on the basis of information input through the environment sensor 166 or an object recognition device (not shown) mounted on the vehicle M. When executing the LKAS as the driving support function, the driving support control device 200 performs the steering control so that the vehicle M travels while maintaining a current traveling lane (lane keeping). When executing the CMBS as the driving support function, the driving support control device 200 performs deceleration control or stop control of the vehicle M in a case in which the inter-vehicle distance between the vehicle M and the preceding vehicle is less than a predetermined distance. The driving support control device 200 outputs, for example, a state of the driving support function to the display control device 150. The driving support control device 200 outputs, to the display control device 150, information (warning information) for warning the driver before executing the LKAS or the CMBS. The warning information is, for example, a lane departure warning, a forward approaching vehicle warning, and the like. In a case in which the various functions described above are executed by the driving support control device 200, an event corresponding to the various functions occurs.

[Display Control Device]

Next, the display control device 150 will be described. The display control device 150 includes, for example, an image generation unit 151, a display mode control unit 152, an interruption determination unit 153, a drive control unit 154, and a storage unit 155. Each of these constitution elements except for the storage unit 155 is realized, for example, by a hardware processor such as a central processor (CPU) executing a program (software). Some or all of these constitution elements may be realized by hardware (a circuit; including a circuitry) such as a large scale integration (LSI), an application specific integrated circuit (ASIC), a field-programmable gate array (FPGA), and a graphics processing unit (GPU) or may be realized by cooperation between software and hardware. The program may be stored in advance in the storage unit (for example, a memory device provided with non-transitory storage medium) 155 such as a HDD or a flash memory of the display control device 150, stored in a removable storage medium (for example, a non-transitory storage medium) such as a DVD or a CD-ROM, or may be installed in the storage unit 155 of the display control device 150 by attachment of a storage medium to a drive device.

For example, in a case in which the display control device 150 receives a signal for an on state by the operation switch 130 (main switch 132), the display control device 150 sets each of functions of the image generation unit 151, the display mode control unit 152, the interruption determination unit 153, and the drive control unit 154 to be executable. In a case in which the display control device 150 receives a signal for an off state, the display control device 150 stops each of the functions described above.

In a case in which the display device 100 is in the on state, the image generation unit 151 generates the first image to be superimposed on a landscape and visually recognized by the driver. In a case in which it is determined by the interruption determination unit 153 that the second image is to be inserted into the image superimposed on the landscape, the image generation unit 151 generates the second image instead of (or in addition to) the first image. The outputs of the displayed first image and the second image may be set by the driver by using the operation switch 130, another operation unit, a graphical user interface (GUI) switch displayed on the second display unit 50-2, or the like. Setting information set by the driver is stored, for example, in the storage unit 155 or the like. For example, in a case in which warning information is output by the driving support control device 200, the image generation unit 151 generates an image element based on occurrence of an event for outputting the warning information. The image element includes, for example, a content, an icon, a mark, a road sign, or the like for identifying the content.

The display mode control unit 152 controls the display mode of the image generated by the image generation unit 151. The display mode is the presence or absence of display of an image (first image and second image) to be superimposed on the landscape and visually recognized by the driver, and a position, a size, a luminance (illuminance) or the like of the image in a case in which the image is displayed. For example, the display mode control unit 152 changes the display mode on the basis of the lens position detected by the lens position sensor 162 and the rotation angle φ of the concave mirror 126 detected by the concave mirror angle sensor 164. The display mode control unit 152 may change the display mode on the basis of the information detected by the environment sensor 166 or the content of the driving support function provided by the driving support control device 200.

Specifically, for example, the display mode control unit 152 outputs control information to the drive control unit 154 so as to change the virtual image visual recognition distance D on the basis of the vehicle speed detected by the environment sensor 166. In this case, for example, the display mode control unit 152 increases the virtual image visual recognition distance D as the vehicle speed is increased, and reduces the virtual image visual recognition distance D as the vehicle speed is reduced. Furthermore, the display mode control unit 152 sets a maximum value or a minimum value of the virtual image visual recognition distance D, and changes the distance within the set range. For example, the display mode control unit 152 may change the luminance or the depression angle θ of the image so that the image is able to be visually recognized by the driver easily on the basis of the illuminance around the vehicle M detected by the environment sensor 166.

The display mode control unit 152 may measure an elapsed time after generating the first image or the second image (or after outputting the generated image). The display mode control unit 152 changes the display mode of the generated image (more specifically, each image element included in the virtual image VI) on the basis of the content of the generated image, the elapsed time, and the operation content received by the operation switch 130. Details of the function of the display mode control unit 152 will be described later.

The interruption determination unit 153 determines, on the basis of the content of the driving support function by the driving support control device 200, whether or not the second image is to be inserted into the first image to be superimposed on the landscape and visually recognized. The second image is, for example, an image related to a lane departure warning, an image notifying that the vehicle M is approaching the preceding vehicle, an image indicating that a collision mitigation brake has been operated, and other warning images. For example, in a case in which the interruption determination unit 153 receives the occurrence of the event for outputting the warning information from the driving support control device 200, the interruption determination unit 153 determines to insert the second image. In a case in which the warning information is not received from the driving support control device 200, the interruption determination unit 153 determines not to insert the second image.

The drive control unit 154 generates a control signal (first control signal) for moving the position of the one or more lenses included in the optical mechanism 122 or a control signal (second control signal) for adjusting the rotation angle of the concave mirror 126 on the basis of the control information by the display mode control unit 152, and outputs the generated control signals to the optical system controller 170. The drive control unit 154 generates the first control signal or the second control signal so that the virtual image VI including the image is visually recognized at a position instructed by the display mode control unit 152 or the virtual image visual recognition distance D, on the basis of the position of the lens detected by the lens position sensor 162 and the rotation angle φ of the concave mirror 126 detected by the concave mirror angle sensor 164, and outputs the generated control signals to the optical system controller 170.

The drive control unit 154 adjusts the position of the image or the virtual image visual recognition distance D on the basis of the operation content received by the operation switch 130. For example, in a case in which the operation of the adjustment switch 134 is received, the drive control unit 154 outputs, to the optical system controller 170, a first control signal for moving the position of the virtual image VI upward in the displayable area A1. In a case in which the operation of the adjustment switch 136 is received, the drive control unit 154 outputs, to the optical system controller 170, a first control signal for moving the position of the virtual image VI downward in the displayable area A1.

The storage unit 155 is realized by, for example, a read only memory (ROM), a random access memory (RAM), a hard disk drive (HDD), a flash memory, or the like. In the storage unit 155, for example, a display mode change table 155a and other pieces of information are stored. FIG. 5 is a diagram showing an example of a content of the display mode change table 155a. In the display mode change table 155a, for example, the display mode of the image to be changed is associated with a change condition. The change condition includes, for example, the presence or absence of the second image, a type of the second image, and an operation condition received by the operation switch 130. "-" in the change condition of FIG. 5 indicates that there is no condition for an item. The display mode control unit 152 is able to change the display mode in accordance with, for example, the type of the second image with reference to the display mode change table 155a. The storage unit 155 may store which image (first image or second image) is to be displayed as the image included in the virtual image VI set by the driver at which position and at which luminance. Alternatively, the storage unit 155 may store setting information as to which position of the displayable area A1 the entire virtual image VI is to be displayed. In a case in which the setting information is not set by the driver, predetermined basic information may be stored in the storage unit 155 as the setting information.

Figure 6:
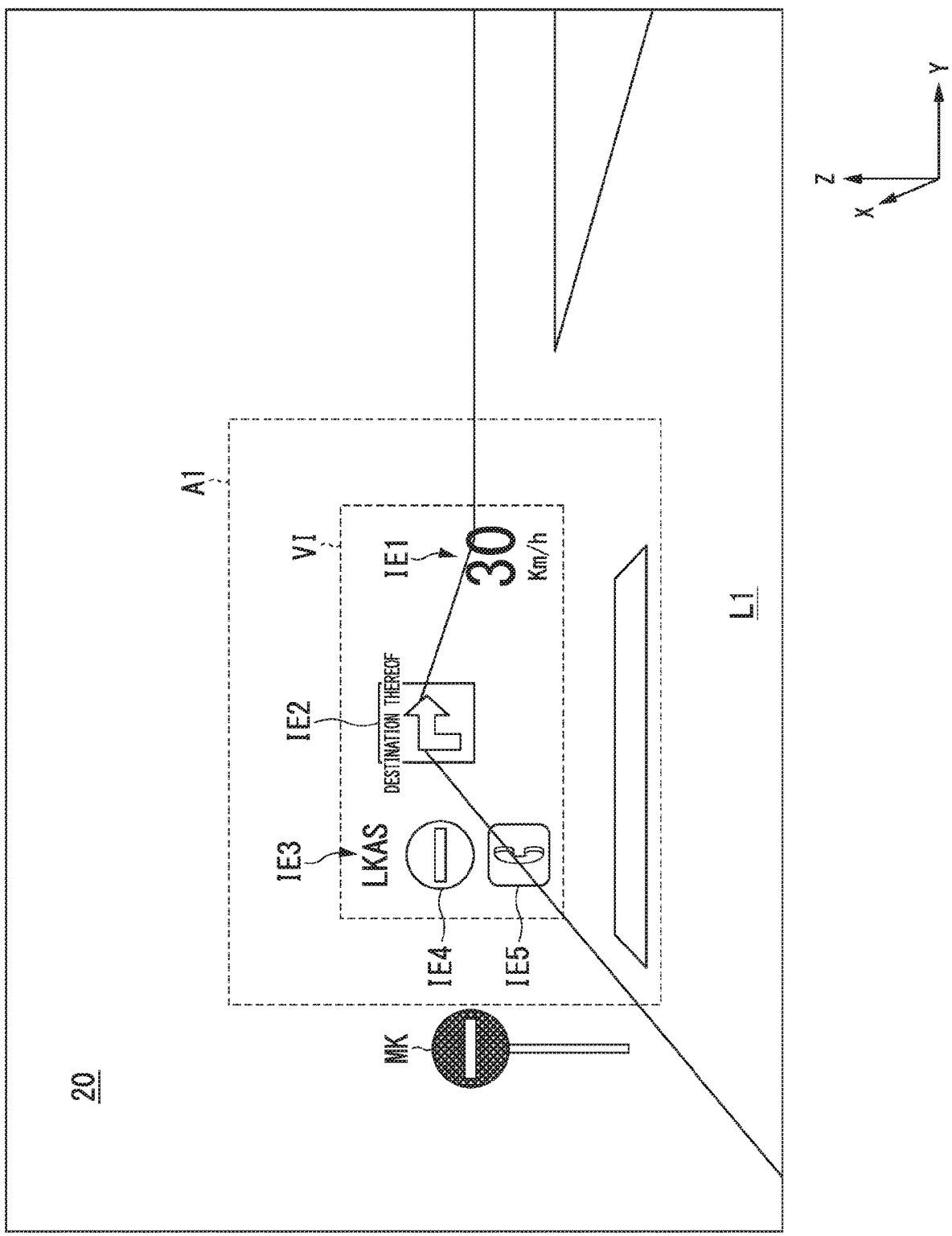
FIG. 6 is a diagram showing an example of a virtual image superimposed on a landscape.

Next, an example of the image superimposed on the landscape by the display device 100 and is able to be visually recognized by the driver as the virtual image VI will be described. FIG. 6 is a diagram showing an example of the virtual image VI superimposed on the landscape. In the example of FIG. 6, it is assumed that the vehicle M is traveling on a road L1. In the example of FIG. 6, an example of the virtual image VI superimposed on a landscape (a landscape of a real space in which the road L1, a sign MK, or the like is present) that is visually recognized through the front windshield 20 by the display device 100 is shown.

The virtual image VI includes one or more image elements IE. The image element is the first image or the second image described above. In the example of FIG. 6, an image element IE1 indicates the speed of the vehicle M and is an example of the first image. An image element IE2 indicates a direction indication, an image element IE3 indicates a type of the driving support function during an execution, an image element IE4 indicates a sign, and an image element IE5 indicates an incoming call in the telephone function mounted on the vehicle M. Each of the image element IE2, the image element IE3, the image element IE4, and the image element IE5 is an example of the second image.

The display mode control unit 152 causes the image including the image element according to a predetermined vehicle state to be output from the light projection device 120, on the basis of the setting information, with reference to the setting information and the like stored in storage unit 155 after activation (on state) of the display device 100. Specifically describing using the example of FIG. 6, for example, in a case in which the display device 100 is activated, the image generation unit 151 generates the image element IE1. In this case, the display mode control unit 152 causes the generated image element IE1 to be displayed to the lower right of the virtual image VI as viewed from the driver.

In a case in which the vehicle M travels in the vicinity of an intersection, the image generation unit 151 generates an image including the image element IE2 corresponding to a display instruction of the direction indication information by the driving support function of the driving support control device 200. In this case, the display mode control unit 152 causes the image element IE2 to be displayed at a center of the virtual image VI on the basis of the setting information. In a case in which it is determined by the driving support control device 200 that there is a possibility that the vehicle M deviates from the lane of the road L1, the image generation unit 151 generates the image element IE3 corresponding to a character "LKAS". In this case, the display mode control unit 152 causes the generated image element IE3 to be displayed to the upper left of the virtual image VI on the basis of the setting information. In a case in which a predetermined sign MK in front of the vehicle M is recognized by the environment sensor 166, the image generation unit 151 generates the image element IE4 corresponding to the sign. The predetermined sign MK includes, for example, signs of a temporary stop, a maximum speed (speed limit), a vehicle entry prohibition, an overtaking prohibition, one-way traffic, and the like. In this case, the display mode control unit 152 causes the generated image element IE4 to be displayed at a center on a left side of the virtual image VI on the basis of the setting information. In a case in which the incoming call by the telephone function mounted on the vehicle M is received, the image generation unit 151 generates the image element IE5 corresponding to an image indicating an incoming call of a telephone. In this case, the display mode control unit 152 causes the generated image element IE5 to be displayed to the lower left of the virtual image VI on the basis of the setting information.

For example, in a case in which the operation is received by the operation switch 130 (for example, the adjustment switches 134 and 136) while the image corresponding to the virtual image VI is displayed, the display mode control unit 152 changes a display mode of one or both of the first image or the second image on the basis of a content of the image generated by the image generation unit 151 and an operation content received by the operation switch 130. The operation by the operation switch 130 may be, for example, a specific operation such as a long press for several seconds or more or a predetermined number of switching operations or more.

For example, the display mode control unit 152 changes the display mode on the basis of whether or not the second image is present in the image generated by the image generation unit 151. Specifically, in a state in which the second image is not included in the image generated by the image generation unit 151 (in a state in which only the first image (for example, the image element IE1) is generated), in a case in which the operation by the operation switch 130 is received, the display mode control unit 152 stops the generation of the first image by the image generation unit 151. The display mode control unit 152 may erase the displayed first image instead of stopping the generation of the first image.

In a case in which the second image (at least one of the image elements IE2 to IE4) is generated by the image generation unit 151 and the operation of the operation switch 130 is received within a predetermined time after the second image is included in the virtual image VI, the display mode control unit 152 changes the display mode of the displayed second image. The above-described predetermined time or the display mode to be changed is set by the display mode change table 155a. The display mode control unit 152 refers to the display mode change table 155a and changes the display mode to the display mode matching a change condition.

Figure 7:
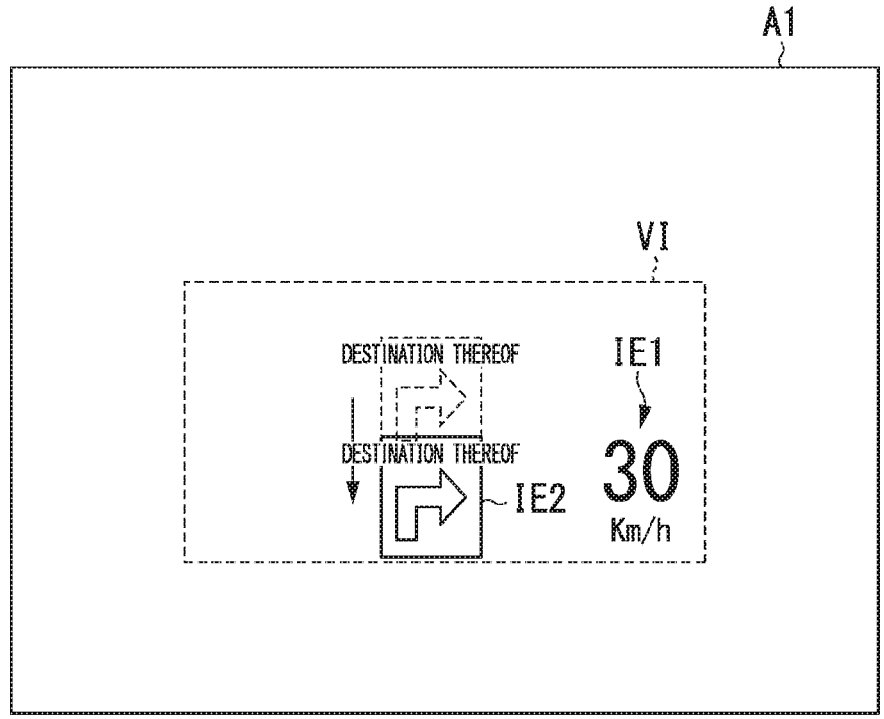
FIG. 7 is a first diagram showing an example of changing a display mode of a second image.

FIG. 7 is a first diagram showing an example of changing the display mode of the second image. In the example of FIG. 7, it is assumed that the image element IE1 that is the first image is displayed in advance and a direction indication image is used as an example of the second image. In FIG. 7 (FIG. 8 described later), the landscape shown in FIG. 6 is omitted. The display mode control unit 152 causes the image element IE2 generated by the image generation unit 151 to be displayed at the center of the virtual image VI on the basis of the display instruction of the direction indication information by the driving support control device 200. Here, it is assumed that the driver feels that the image element IE2 included in the virtual image VI is troublesome and operates the operation switch 130 within a predetermined time (for example, within one second) after the image element IE2 is displayed. In a case in which the display mode control unit 152 receives the operation by the operation switch 130, the display mode control unit 152 refers to the display mode change table 155a stored in the storage unit 155, and changes the display mode to move the image element IE2 downward so that the depression angle is increased by the display mode matching the change condition. In this case, the image element IE1 is not moved, and the display mode of only the image element IE2 that is displayed immediately before is changed.

Figure 8:
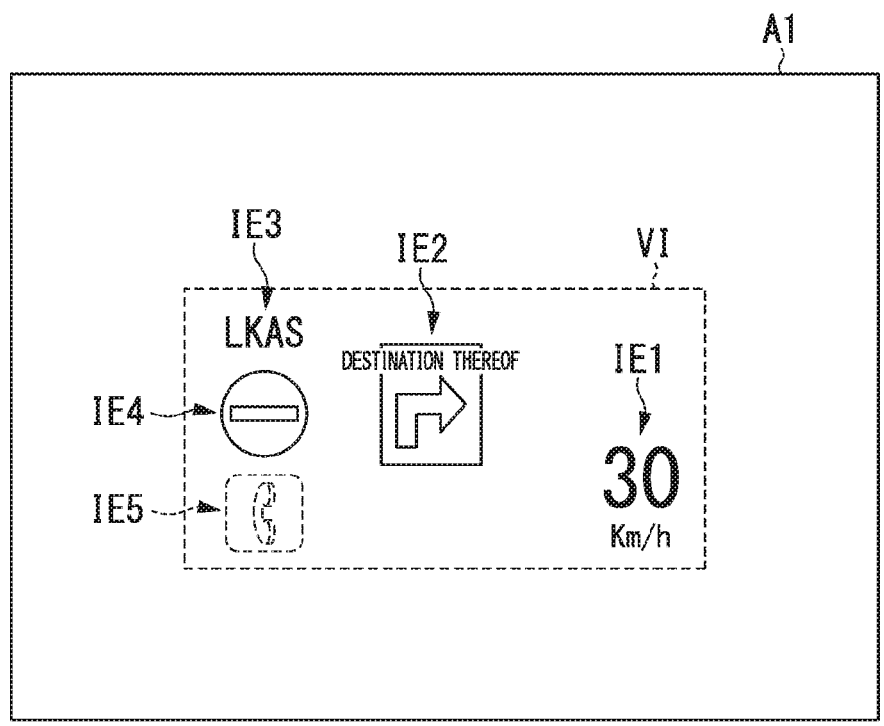
FIG. 8 is a second diagram showing an example of changing the display mode of the second image.

FIG. 8 is a second diagram showing an example of changing the display mode of the second image. In the example of FIG. 8, it is assumed that the image elements IE2 to 1E4 of the second image are displayed in advance. For example, in a case in which an incoming call to a telephone mounted on the vehicle M is received by the driving support control device 200, the image generation unit 151 generates the image element IE5 indicating the incoming call. In addition, the display mode control unit 152 causes the image element IE5 generated by the image generation unit 151 to be displayed at the lower left as viewed from the driver in an area of the virtual image VI. Here, it is assumed that the driver feels that the image element IE5 included in the virtual image VI is troublesome and operates the operation switch 130 within a predetermined time (for example, within 4 seconds) after the image element IE5 is displayed. In a case in which the display mode control unit 152 receives the operation by the operation switch 130, the display mode control unit 152 refers to the display mode change table 155a stored in the storage unit 155, and changes the display mode so that the image element IE is hardly to be viewed by the display mode matching the change condition. In the example of FIG. 8, the display mode control unit 152 changes the display mode to reduce the luminance in accordance with the ambient illuminance obtained by the environment sensor 166. That is, the luminance is adjusted to a luminance which is hardly to be viewed on the basis of the illuminance of the background of the virtual image VI. A change amount of the luminance may be a fixed amount or may be changed in accordance with the ambient illuminance. The display mode control unit 152 does not change the luminance of the other image elements IE1 to 4, and changes the luminance of only the image element IE5 that is displayed immediately before.

The display mode control unit 152 may change the virtual image visual recognition distance D instead of or in addition to the change of the display position or the luminance described above. The display mode control unit 152 may change the display mode of all the second images (image elements IE2 to IE5) included in the virtual image VI in a case in which the change condition is satisfied, instead of the control described above. In this case, the display mode control unit 152 changes a display target of all the second images included in the virtual image VI in a case in which one or more change conditions of a plurality of second image change conditions are satisfied. In a case in which all the changed images are displayed, for example, the generation (or display) of the second image may be stopped or the displayed second image may be erased, and all the image elements IE2 to IE5 may be moved to a position spaced apart from the center of the virtual image VI. The display mode control unit 152 may stop all generation of the first image and the second image (image elements IE1 to IE5) or erase the displayed first image and second image, in a case in which the change condition is satisfied, instead of the control described above. As described above, in the embodiment, the change condition includes a predetermined operation by the driver, and the operation is received to change the display mode of the image element IE included in the virtual image VI. Therefore, it is possible to reduce the troublesomeness of the interruption display by an intention of the driver. It is not necessary to perform a complicated operation using a menu screen or the like, and it is possible to change a display mode to a display mode suitable for people or an environment more quickly by a simple operation.

[Process Flow]

Figure 9:
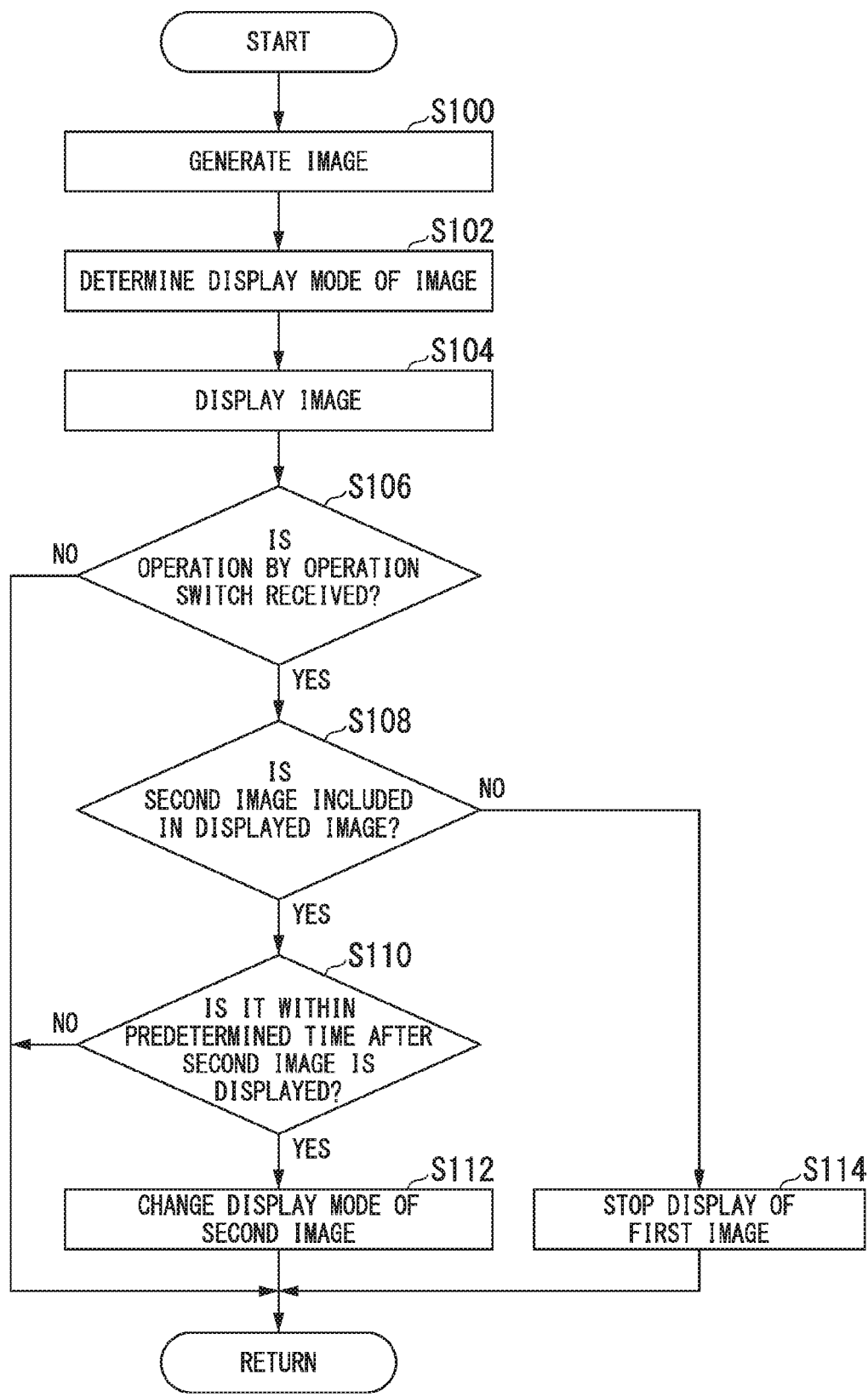
FIG. 9 is a flowchart showing a flow of a process executed by the display device of the embodiment.

FIG. 9 is a flowchart showing a flow of a process executed by the display device 100 of an embodiment. The process of FIG. 9 is repeatedly performed at a predetermined timing, for example, after the display device 100 is in the on state by the operation switch 130.

First, the image generation unit 151 generates the image to be superimposed on the landscape on the basis of the setting information and the like stored in the storage unit 155 (step S100). Next, the display mode control unit 152 determines the display mode of the generated image (step S102).

The image (specifically, the virtual image VI including the image) is displayed in the display mode determined by the display controller 172 (step S104).

Next, the display mode control unit 152 determines whether or not the operation by the operation switch 130 is received (step S106). In a case in which it is determined that the operation by the operation switch 130 is received, the display mode control unit 152 determines whether or not the second image is included in the displayed image (step S108). In a case in which it is determined that the second image is included in the displayed image, the display mode control unit 152 determines whether or not the operation by the operation switch 130 is received within a predetermined time after the second image is displayed (step S110). In a case in which it is determined that the operation by the operation switch 130 is received within the predetermined time, the display mode control unit 152 changes the display mode of the second image on the basis of the type of the second image (step S112). In a case in which it is determined in the process of step S108 that the second image is not included in the displayed image (that is, in a case in which only the first image is generated), the display mode control unit 152 stops the display of the first image (or generation of the first image) (step S114). In the process of S114, the display mode control unit 152 may erase the displayed first image instead of stopping the generation of the first image. Therefore, the process of the present flowchart is ended.

In a case in which it is determined in the process of step S106 that the operation by the operation switch is not received, or in a case in which it is determined in the process of step S110 that the operation by the operation switch 130 is not received within the predetermined time after the second image is displayed, the process of the present flowchart is ended.

According to the embodiment described above, the display device 100 includes the display 110 for superimposing the image on the landscape and allowing the viewer to visually recognize the image, the display control device 150 for controlling the display 110, and the operation switch 130 for receiving the control of the display position of the image. The display control device 150 generates the first image and the second image to be inserted into the first image and to be superimposed on the landscape. The display control device 150 changes the display mode of one or both of the first image or the second image output by the display 110 on the basis of the content of the image generated by the display 110 and the operation content by the operation switch 130. Therefore, it is possible to display the image in more suitable display mode.

Instead of projecting the image directly on the front windshield 20, the display device 100 may projects the image on a light transmissive reflective member such as a combiner provided between the position of the driver and the front windshield 20.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A display device comprising:
an image generation device configured to superimpose an image on a landscape;

a control device configured to control the image generation device; and an operation unit configured to receive an operation related to display of the image, wherein the image generation device generates a first image constantly displayed and a second image displayed based on occurrence of a predetermined event, in response to receipt of the operation by the operation unit, the control device changes a display mode of at least one of the first image or the second image based on content of the second image and an operation content of the operation received by the operation unit, wherein, in response to determining that the operation is received by the operation unit within a predetermined time after the second image is generated while the first image is being displayed, the control device changes the display mode of the second image without changing the display mode of the first image.

2. The display device according to claim 1, wherein, in response to receipt of the operation by the operation unit while the first image is displayed and the second image is not displayed, the control device stops generation of the first image by the image generation device or erases the first image.

3. The display device according to claim 1, wherein, in response to receipt of the operation by the operation unit within the predetermined time after the second image is displayed, the control device changes a luminance of the second image.

4. The display device according to claim 1, wherein, in response to receipt of the operation by the operation unit within the predetermined time after the second image is displayed, the control device changes a depression angle of the second image.

5. The display device according to claim 1, wherein, in response to receipt of the operation by the operation unit within the predetermined time after the second image is displayed, the control device stops generation of the first image and the second image by the image generation device, or stops the generation of the second image.

6. The display device according to claim 5, wherein the predetermined event is an event that occurs while the vehicle is traveling.

7. The display device according to claim 1, wherein, in response to receipt of the operation by the operation unit within the predetermined time after the second image is displayed, the control device erases the first image and second image, or erases the second image.

8. The display device according to claim 7, wherein the predetermined event is an event that occurs while the vehicle is traveling.

9. The display device according to claim 1, wherein the image generation device comprises:
  a light projection device configured to output the first image and the second image as light;
  an optical mechanism provided on a path of the light and capable of adjusting a distance from a predetermined position to a position where the light is formed as a virtual image;
  a concave mirror configured to reflect light passing through the optical mechanism toward a reflector;
  a first actuator configured to adjust the distance in the optical mechanism; and
  a second actuator configured to adjust a reflection angle of the concave mirror.

10. The display device according to claim 1, wherein,

In response to receipt of the operation by the operation unit, the control device changes a selected one of a presence, a position, a size, or a luminance of at least one of the first image or the second image, and The control device selects the selected one of the presence, the position, the size, or the luminance based on a content of the second image and an operation content of the operation received by the operation unit.

11. A display control method comprising:

generating an image superimposed on a landscape by an image generation device;

controlling the image generation device by a control device; and receiving, by an operation unit, a control input directed to the image, wherein the generating the image comprises:
  displaying a first image constantly and displaying a second image based on occurrence of a predetermined event;
  in response to the receiving of the control input, changing a display mode of at least one of the first image or the second image output by the image generation device based on a content of the second image and operation content of the control input received by the operation unit; and
  in a state in which the first image is displayed and the control input is received by the operation unit within a predetermined time after the second image is generated, changing the display mode of the second image without changing the display mode of the first image.

12. A non-transitory computer-readable storage medium that stores a program that causes a display device to:

generate a first image constantly displayed and a second image displayed based on occurrence of a predetermined event, wherein the first image and the second image are superimposed on a landscape;

in response to receipt of a control input, change a display mode of at least one of the first image or the second image based on content of the second image and operation content of the control input received by the operation unit; and in response to determining that the control input is received while the first image is displayed and within a predetermined time after the second image is generated, change the display mode of the second image without changing the display mode of the first image.

* * * * *